March 4, 1958 F. B. JACKSON 2,825,791
HOUSE HEATING UNIT USING ELECTRICAL HEATING
ELEMENTS NOVELLY ORGANIZED AND CONTROLLED
Filed June 28, 1956 4 Sheets-Sheet 4

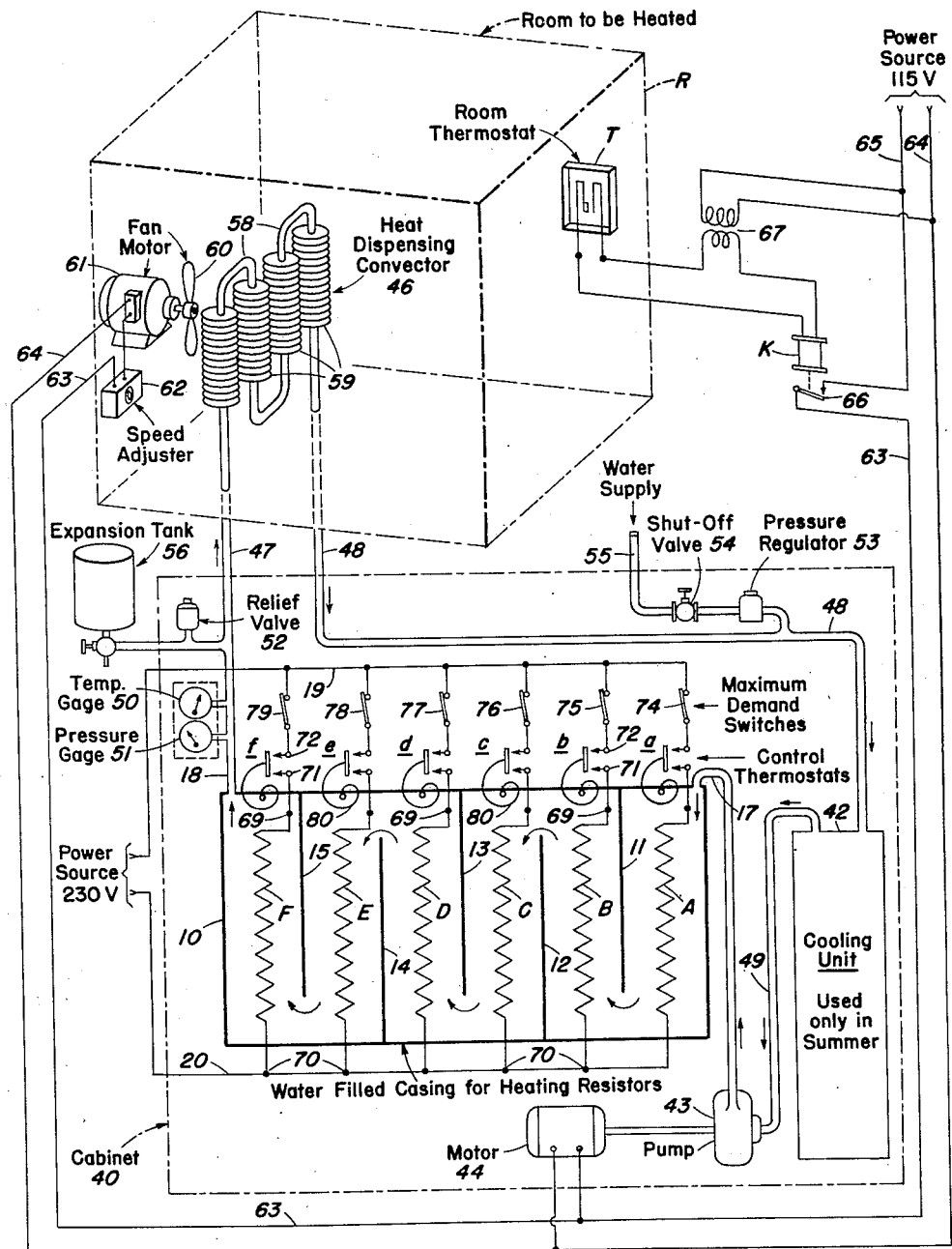
Fig. I.

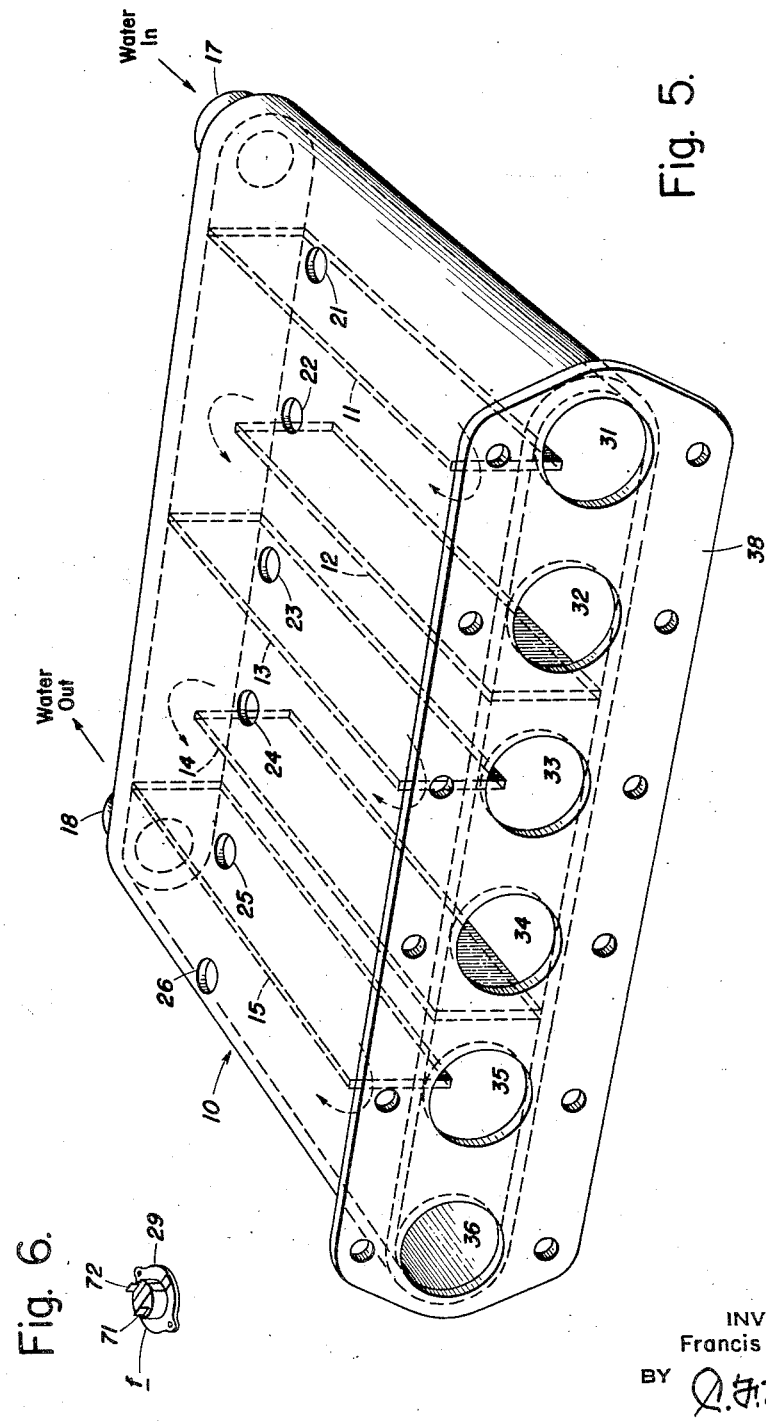

INVENTOR.
Francis B. Jackson
BY
ATTORNEY

United States Patent Office 2,825,791
Patented Mar. 4, 1958

2,825,791

HOUSE HEATING UNIT USING ELECTRICAL HEATING ELEMENTS NOVELLY ORGANIZED AND CONTROLLED

Francis B. Jackson, Chattanooga, Tenn., assignor to Combustion Engineering, Inc., New York, N. Y., a corporation of Delaware Application June 28, 1956, Serial No. 594,608

3 Claims. (Cl. 219—39)

My invention relates generally to units for heating homes or the like and it has special reference to such house heating units wherein the energy needed to warm individual rooms and other areas is liberated at one central point or location and is derived from a source of electrical power.

Broadly stated, the object of my invention is to provide such a heating unit for homes or the like that is extremely compact, has a minimum of parts, is highly efficient in operation and can be quickly and easily substituted for presently existing conventional heating units.

A more specific object is to improve the design and better the performance of such home heating units wherein heat liberated by electrical heating elements forming a part of a centrally located boiler apparatus is conveyed to the individual rooms of the house through the medium of circulating hot water.

Another object is to incorporate such heating elements into the unit in a novel way and to control the temperature and the circulation of such heat-carrying water in a simplified and otherwise improved manner.

A further object is to arrange the new control facilities in a way which minimizes the maximum power drawn by the unit from its electrical supply circuit.

An additional object is to accomplish the foregoing through use of a plurality of thermostats respectively identified with the several electrical heating elements and respectively responding to the temperature of the water heated by those elements during serial or progressive flow of the water over said several elements.

Still other objects and advantages will become apparent as the disclosure and description hereof proceeds.

My inventive improvements will best be understood from the following detailed description of an illustrative embodiment thereof when read in conjunction with the accompanying drawings wherein:

Fig. 1 is a diagrammatic view of a heating system organized in accordance with my invention to make novel utilization of electrical heating elements and of cooperating thermostat control switches;

Fig. 5 is an isometric or perspective view of the sheet metal boiler casing which accommodates said six electrical heating units together with six thermostat control switches therefor;

Fig. 6 is a perspective view of one of the said six thermostat switches with which the boiler assemblage of Figs. 3-4-5 is equipped;

Looking first at Fig. 1 I have there shown a preferred embodiment of my new electrical heating unit and system wherein boiler means, generally designated 10, comprise a fluid-tight casing of sheet metal construction provided with six horizontally disposed compartments into which electrical heating elements A through F respectively extend. From Figs. 1, 3 and 5 it will be seen that these six compartments or sections are serially arranged in cooperation with partitions 11, 12, 13, 14 and 15 in a way which permits water to be passed serially therethrough successively from one compartment to the next between an entering inlet 17 into the first compartment of the series and a leaving outlet 18 from the last compartment of the series.

Figure 3:
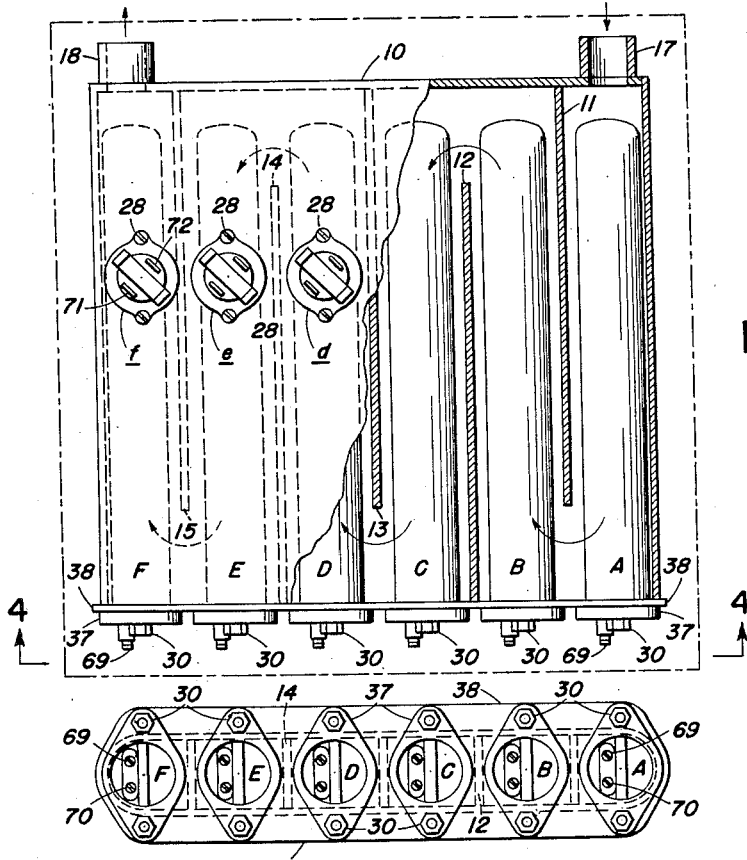
Fig. 3 is a top plan view, taken on line 3—3 of Fig. 2, showing the multi-heating element boiler assemblage which is diagrammed in the lower portion of Fig. 1 and which is supported within the upper portion of the Fig. 2 cabinet.
Figure 4:
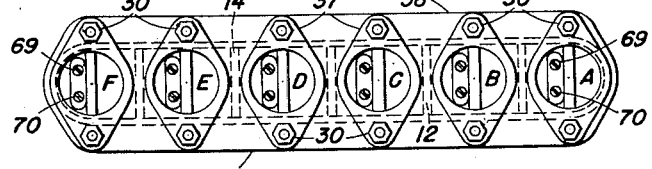
Fig. 4 is an end view on line 4—4 of Fig. 3 showing the terminal and mounting ends of the six electrical heating elements with which said Fig. 3 boiler assemblage is equipped.

The aforesaid electrical heating elements A through F may satisfactorily take the form of resistors of any suitable design such as the more or less conventional one shown in Figs. 3 and 4. In one successful construction for this boiler unit 10 each of these heating elements has a capacity of 5,000 watts; wherefore when all six elements are connected between power source conductors 19 and 20 the energy input to the boiler means 10 will total 30 kilowatts. Obviously each elements may be of either greater or lesser capacity and a total of either more or less than the six elements here illustratively represented at A through F may be utilized with a consequent heat input of more or less than 30 kilowatts. Said power supply circuit shown at 19—20 in Fig. 1 may be of commercial potential (such as 230 volts) and frequency (such as 60 or 25 cycles).

Figure 7:
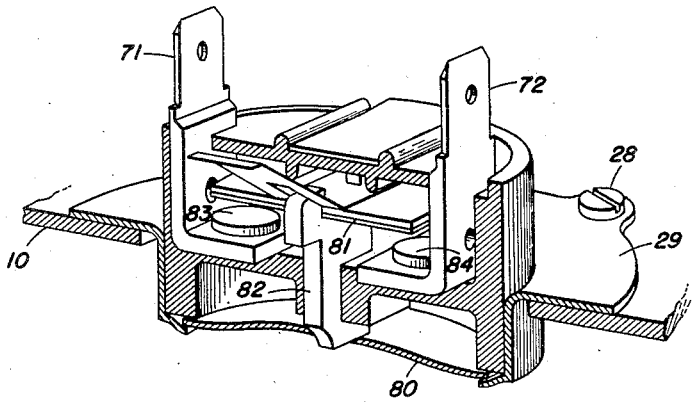
Figs. 7 and 8 are cut away views showing the internal construction of said Fig. 6 thermostat switch when the contacts thereof respectively are opened and are closed.
Figure 8:
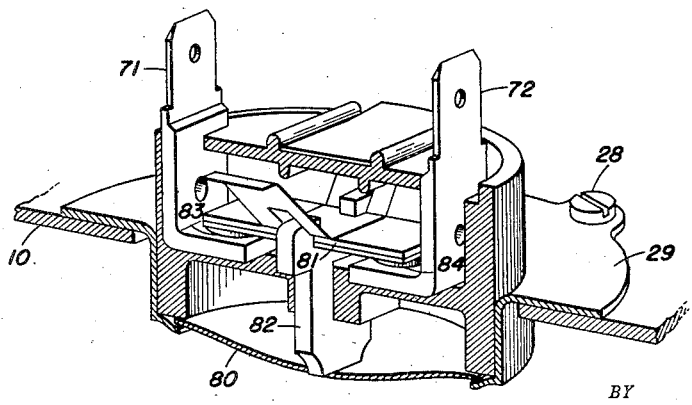

Each of said six heating elements A through F is provided with its individual thermostat control switch. Such thermostat switches are designated $a$, $b$, $c$, $d$, $e$, and $f$ in Figs. 1, 3 and 6; and these switches may satisfactorily have the internal construction that is represented by Figs. 7 and 8. Those latter views show how each of said six thermostat switches is inserted into an accommodating opening in the top wall of boiler casing 10 for exposure to the water in the compartment identified with the heating element immediately therebeneath. In Fig. 5 said mounting openings for the six thermostat switches $a$ through $f$ are designated as 21 through 26.

Each such thermostat switch is secured in its appropriate place on the top of boiler casing 10 by the aid of holding screws shown at 28 in Figs. 3, 7 and 8. These screws clamp the switch body firmly over its opening and establish a fluid tight contact between the switch flange 29 and the casing wall of boiler 10 therebeneath.

In another and more simplified arrangement, these thermostat switches $a$ through $f$ need not actually extend through the top wall of boiler casing 10 but may instead be mounted on top of that wall. This permits the casing wall to be made continuous without any of the openings 21 through 26 of Fig. 5. The six thermostant switches will of course be attached to the wall top over the areas where those openings (no longer used) now are located. With such a simplified arrangement the bimetal discs 80 of said thermostats will be in close promixity to the boiler wall areas therebeneath and accordingly will respond to the so-called "skin" temperature of those areas. Such "skin" temperatures duplicate very closely the fluid temperatures of the water in the six boiler compartments A through F respectively beneath the thermostat switches

*a* through *f*; ad those switches thus will respond in the same manner as when the switch mounting here represented is used.

Likewise each of the six heating elements A through F is secured into its end opening in boiler casing 10 by the aid of the holding bolts that are shown at 30 in Figs. 3 and 4; the openings for said six heating elements being designated 31 through 36 in Fig. 5. Said bolts 30 clamp the element end flanges 37 against the main end flange 38 of boiler casing 10 in a fluid tight manner. Conventional gaskets (not shown) may of course be used between each heating element flange 37 and the boiler casing flange 38 and also between each thermostat switch flange 29 and the top wall of boiler casing 10.

The illustrative boiler assemblage here shown at 10 thus receives the six heating elements A through F and the six thermostat control switches *a* through *f* in fluid tight manner with result that water introduced via inlet 17 is confined by casing 10 and can escape therefrom only via outlet 18. In consequence the incoming water admitted at 17 first passes around and over heating element A to flow beyond the end of baffle 11 into the second compartment and around and over heating element B and thence beyond the end of baffle 12 into the third compartment over element C and in similar manner progressively over elements E and F, finally leaving the boiler assemblage via outlet 18.

The said boiler assemblage is supported in the upper portion of the heating unit cabinet which is shown at 40 in Fig. 3. This support may be at any suitable location beneath the cabinet top 41; and it maintains the sheet metal boiler casing 10 in the horizontal position depicted by Figs. 4 and 5. Because the details of such support are more or less conventional no attempt is here made to represent them. Instead it will suffice to say that the boiler casing assemblage 10 thus supported in the cabinet preferably is surrounded by insulating material which minimizes the escape of heat from the assemblage.

Said heating unit cabinet 40 is installed at some central location in the house that is to be heated; and in the complete system depicted by Fig. 1 the cabinet may if desired further contain a cooling unit 42 in the lower portion thereof. Such cooling unit will be used only in the summer and since it forms no direct part of the present invention neither the details thereof nor the mounting therefor in cabinet 40 are represented here.

Further included in said centrally located cabinet 40 are a water circulating pump 43 and a driving motor 44 therefor. When activated pump 43 passes into boiler inlet 17 water which has returned to cabinet 40 from one or more heat dispensers represented by Fig. 1 in the form of a convector 46. This convector is shown as being positioned in a room or other defined space R that is to be warmed by the heat carried thereto from boiler 10 via the hot water which pump 43 circulates through the series compartments in the boiler and thence passes from outlet 18 to the room heating convector via suitable piping 47. From the room convector 46 the circulating water returns to cabinet 40 via other suitable piping shown in Fig. 1 at 48.

The represented return circuit includes cooling unit 42 which as before stated is inactive during the winter months when need for room heating exists. Insofar as heating unit operation is concerned return piping 48 can therefore bypass cooling unit 42 and connect directly into pump inlet circuit 49.

Each room or other area to be heated will of course be provided with a heat dispenser similar to the device shown at 46 for the defined space R of Fig. 1; and such additional heat dispensers 46 will be connected with supply and return piping 47—48 either in parallel with the single dispenser 46 of Fig. 1 or in series therewith. The requirement here is that these several heat dispensing convectors 46 shall all receive from boiler 10 the heated water which pump 43 circulates through the system.

Figure 2:
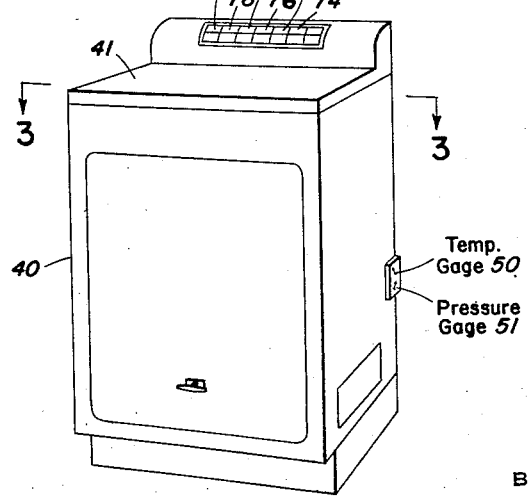
Fig. 2 is an overall view of the heating unit cabinet in the upper portion of which the novel boiler facilities shown by Fig. 1 are housed in the generally horizontal position depicted by Figs. 4 and 5.

The heating unit cabinet represented at 40 in Figs. 1 and 2 still further includes conventional accessories such as temperature and pressure gages 50 and 51 (these appear in Fig. 2 as well as in Fig. 1) plus a relief valve 52, a pressure regulating valve 53 and a shut-off valve 54. These latter two devices are interposed between a water supply conduit 55 and the water return piping 48 of the heating system. A conventional expansion tank likewise may connect with water distribution conduit 47 as shown at 56 in Fig. 1.

The total water capacity of the complete system is comparatively low, it typically being less than 15 gallons for an installation adequate to serve a six room house. The operating pressure likewise is kept low with about 15 lbs. per sq. inch being typical.

Each room convector 46 may utilize highly efficient water-to-air transfer surface consisting of copper tubing 58 provided with alumium fins 59. Preferably each convector has mounted therebehind a fan 60 whose driving motor 61 may be set via adjuster 62 to operate at the speed most suitable for the heating needs of the room being warmed.

Serving to energize each of these fan motors 61 (all typically will be connected in parallel) for the room convectors and also to energize the pump motor 44 in the heating unit cabinet 40 is an electrical circuit represented in Fig. 1 as including conductors 63 and 64. This circuit is at proper times connected with a suitable power source (such as of 115 volt potential) by contact 66 of a relay K. Said relay in turn is controlled by a thermostat T located in the room or other defined space R that is being heated. The potential applied to devices T and K is reduced to some low value such as 24 volts by a transformer 67 interposed between power source 64—65 and the named devices.

When the temperature in room R falls to a predetermined value (such as 70° F.) thermostat T picks up relay K causing contact 66 to connect pump motor 44 and fan motor 61 with power source 64—65. This causes pump 43 to circulate hot water through boiler 10 and heat dispenser 46 and thence back to the boiler via piping 48—49. Heat imparted to said circulating water by one or more of the electrical resistors A through F is in this way carried from the boiler to the room convector 46 where that heat serves to elevate the room temperature.

When that temperature reaches some selected higher value (such as 72° F.) thermostat T opens its contacts and de-energizes relay K. It now opens contact 66 and thus stops operation both of pump motor 44 in the heating unit cabinet and of fan motor 61 in the room R.

In some instances the room convector 66 can be designed for satisfactory operation without the aid of motor driven fan 60; or the system may be arranged so that fan 60 is operated continuously without regard to whether circulating pump 43 is or is not running. In either of those situations only the pump motor 44 need be placed under the control of relay K and thermostat T. However when a fan 60 is used as shown in Fig. 1 the effectiveness of convector 46 in dispensing heat into room R can be altered by changing the setting of adjuster 62 and the resultant running speed of motor 61.

Further attention will now be given to the new and improved boiler assemblage shown at 10 in each of Figs. 1, 3, 4 and 6. The six electrical heating elements A through F thereof are connected with their supply circuit 19—20 (Fig. 1) by means of the terminals shown at 69 and 70 in Figs. 3 and 4. Likewise each of the six associated thermostat control switches *a* through *f* is equipped with terminals which are shown at 71 and 72 in each of Figs. 1, 3, 6, 7 and 8 and by the aid of which the electrical connections diagrammed by Fig. 1 are made inside of cabinet 40 of Fig. 2. Also included in said connections are maximum demand switches represented at 74 through 79 in each of Figs. 1 and 2. These can be manipulated manually from the outside of cabinet 40 due to their represented positioning along the upper rear portion of cabinet top 41 (Fig. 2).

As their name implies the purpose of these switches is to limit the maximum demand for power that can be drawn by boiler unit 10 from its energizing source 19—20. Closure of all six of these switches 74 through 79 enables the six heating elements A through F all to be energized under certain conditions of heavy heating demand; and when each of these elements has a rating of 5,000 watts this will mean a maximum total demand of 30,000 watts. Opening of one switch in this series will by cutting out its associated heating element reduce the maximum possible demand by 5,000 watts, lowering the total to 25,000 watts in the case assumed. Opening a second switch will bring it down to 20,000 watts; a third switch down to 15,000 watts, and so on.

Looking now more closely at the thermostat control switches $a$ through $f$, these may satisfactorily be of the construction represented by Figs. 7 and 8. In the design there shown each such switch utilizes a bimetal disc 80 which projects downwardly over the particular heating element A, B, C, D, E or F with which the switch is identified and which it serves to control. Because of its contact with that compartment water this disc 80 is kept at substantially the same temperature as is the water; and as long as said temperature remains above a preselected value the disc has the upwardly dished position of Fig. 7 wherein a contact bar 81 is moved via link 82 to the upward position wherein it is physically separated from contacts 83 and 84 of the switch.

However when the temperature of the water in contact with disc 80 falls below said preselected value the disc snaps to the opposite or downwardly dished position shown by Fig. 8. Here it has (through link 82) moved contact bar 81 downwardly to bridge stationary contacts 83 and 84 and thereby connect switch terminal 71 with switch terminal 72. This closed-contact status of the switch continues until the temperature of the contacted water has risen somewhat above the aforesaid preselected value, as to a value about 10 degrees higher. When that happens the bimetal disc 80 once more snaps to the original upwardly dished position of Fig. 7 wherein bar 81 removes the bridging connection between contacts 83 and 84 and disconnects switch terminal 71 from terminal 72.

Figure 9:
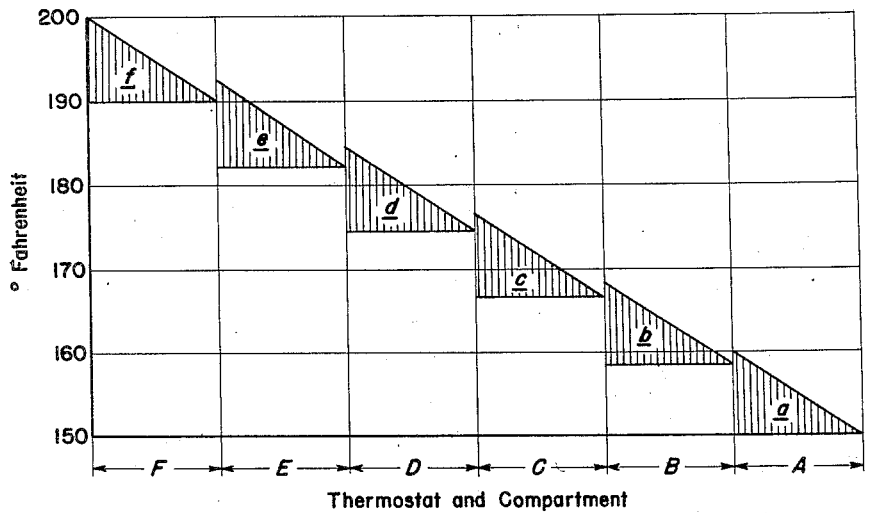
Fig. 9 is a chart or diagram showing the progressively higher temperatures to which the six thermostat switches of the system are respectively set to respond.

In the illustrative heating system here disclosed the six thermostat control switches $a$ through $f$ are set to respond to water temperatures of progressively higher values from the first or water-entering compartment A of boiler 10 to the last or water-leaving compartment F thereof. This relationship is depicted by the graph of Fig. 9. Said graph indicates that the first thermostat switch $a$ keeps its contacts open as long as the temperature of the water flowing over heating element A in the first boiler compartment beneath the switch remains above 150° F.; but that when said water temperature falls to 150° F. or below switch $a$ closes and stays closed until the water surrounding element A has been heated to 160° F. or above, at which time switch $a$ reopens.

Fig. 9 further indicates that thermostat switch $b$ in the second compartment is set to remain open as long as the water passing over heating element B in said second compartment remains above 158° F., but that when temperature of that water falls to 158 or below switch $b$ will close its contacts and keep them closed until the water surrounding element B has been heated to 168° F. or above, at which point switch $b$ will reopen.

Similarly the third thermostat switch $c$ is set to remain open as long as the temperature of the contacted water surrounding heating element C in the third compartment is above 166° F.; but when the temperature of said water falls to 166° or below switch $c$ closes and stays closed until said water temperature has risen to 176°; at which point switch $c$ reopens.

In the case of the fourth thermostat switch $d$ the contacts thereof are set to remain open as long as the temperature of the water surrounding heating element D in the fourth compartment is above 174° F.; but when said water temperature drops to 174° or below switch $d$ closes and stays closed until that water temperature has risen to 184° F., at which point switch $d$ reopens. Similarly, the fifth thermostat switch $e$ is set to remain open as long as the water surrounding heating element E in the fifth compartment is above 182° F.; but when said water temperature drops to 182° or below switch $e$ closes and stays closed until that temperature has been raised to 192° F., at which point the switch reopens.

And finally the sixth and last thermostat switch $f$ is set to stay open as long as the temperature of the water surrounding heating element F in the six compartment is above 190° F.; but when said water temperature drops to 190° or below switch $f$ closes and stays closed until that temperature has been raised to 200° at which point switch $f$ reopens. It will of course be understood that in the case of all six of these thermostat switches other ranges of temperature (such as more narrow) are possible and may be preferable.

In the complete heating system depicted by Fig. 1 it will thus be apparent that at maximum heating capacity of boiler 10 (with demand switches 74 through 79 all being closed) the circulating water returning from the room convectors 46 and entering boiler inlet 17 will be at a temperature below 150° F.; that all six of the heating elements A through F then will be active in raising the water temperature in increments so that the boiler water leaving outlet 18 will be at 200° F. or slightly below; and that the circulating pump 43 plus the fan motor 61 then will be held in operation by room thermostat T.

As now the temperature of room R rises (due to the heat brought in by convector 46) thermostat T will shut off circulator pump 43 and fan motor 61 as soon as a predetermined heating intensity (such as 72° F.) has been attained. This will stop water circulation through boiler 10. The first heating element A then soon will bring the temperature of the first compartment water therearound to 160° F. causing thermostat switch $a$ then to cut said first element A out of the heating circuit.

The second heating element B will similarly be cut out when the temperature of the second compartment water therearound reaches 168°; the third element C will likewise be cut out when the temperature of the third compartment water therearound rises to 176°; the fourth element D will be cut out when the temperature of the fourth compartment water therearound rises to 184°; the fifth element E will be cut out when the temperature of the fifth compartment water therearound rises to 192°; and the sixth and last element F will be cut out when the temperature of the sixth compartment water therearound rises to 200°.

All six of these heating elements A through F now will stay cut out until the temperature of the water around one or more of them thereafter falls to within the response range of the associated element control thermostat $a$ through $f$, when the affected element (such as F) will again be cut in for a time (usually a matter of seconds) long enough to elevate the water temperature above the thermostat range for that particular element. Such cutting in will continue at intervals determined by the heat loss of the boiler assemblage 10.

As the temperature of room R now falls and creates a demand for more heat, thermostat T will (through relay K) reactivate pump motor 44 and fan motor 61. The resultant circulation of water through boiler 10 and heat dispenser 46 will carry more heat from the boiler into room R, with consequent lowering in the temperature of the water returned from room convector 46 to boiler inlet 17 via piping 48. This will lower the temperature of the water which surrounds heating elements A—B—C—D—E—F and which is in contact with bimetal discs 80 of the associated thermostat switches *a* through *f*; and said thermostat switches will thereupon again cut in such of those heating elements A through F as may be required to restore a heat balance adequate for meeting the needs of defined space R.

It has already been pointed out that the improved heating unit here shown and described is applicable to situations wherein more than one heat dispensing device 46 is to be included in the system; also that in such situations the additional room convectors may be connected either in series or in parallel with the single heat dispenser illustrated at 46 in Fig. 1.

A home heating unit which incorporates my new and improved electrically energized boiler means 10 and my novel controls therefor offers a number of very practical advantages. Among these is reduction in the rate of power demand build up on supply circuit 19—20 due to the fact that heating elements A through F are by the differently set thermostat control switches *a* through *f* brought into service successively rather than simultaneously. Moreover demand switches 74 through 79 permit the maximum total circuit loading to be limited as desired.

Another advantage resides in the extreme compactness of the boiler assemblage 10 including heating elements A through F and thermostat control switches *a* through *f*. Illustrative of this is the fact that the 30,000 watt capacity boiler here represented has a thickness dimension for the body of its casing 10 (from top to bottom—see Figs. 4 and 5) of less than 3", an overall width (across the six heating compartments) of less than 20" and an overall length from front to back (see Figs. 3 and 5) of less than 18". The thermostat control switches *a* through *f* (Figs. 6, 7 and 8) add very little to the total thickness dimension.

A further advantage resides in the simplicity and low cost of the installation. The sheet metal boiler casing 10 (Fig. 5) can be fabricated readily and inexpensively; the electrical heating elements A through F are obtainable in standardized designs of comparatively low cost; and the same can be said for the thermostat control switches *a* through *f*.

And finally the operating efficiency of this improved system is commendably high; the control of room temperature and water circulation is simple and practical; the reliability is excellent; and the maintenance is low.

While I have shown and described only one preferred embodiment of my invention, it is to be understood that such embodiment is illustrative rather than restrictive and that variations and modifications may be made therein without departing from the spirit and scope of the invention. I therefore do not wish to be limited to the precise details set forth but desire to avail myself of such changes and alterations as fall within the purview of the following claims.

What I claim is:

1. In a heating system for homes and the like, the combination of boiler means having a plurality of compartments serially arranged for the passage of fluid successively therethrough from one compartment to the next between an entering inlet into the first compartment of the series and a leaving outlet from the last compartment of the series; electrical heating elements respectively disposed in said serially arranged compartments, each of said elements serving when energized to raise the temperature of the fluid surrounding and flowing over the element in its compartment; individual thermostat control switches for the said heating elements in the aforesaid plurality of fluid compartments, the said switch for each element being at the same physical location as the fluid around that element in its said compartment and being directly responsive to the temperature of said element-surrounding fluid and establishing connection of said element with a power source when and only when said compartment fluid temperature falls below a preselected value, said preselected temperature value being lowest for the thermostat switch that is identified with the first element in said first compartment of the aforesaid compartment series and being progressively higher for the switches that are identified with the next and with succeeding elements respectively disposed in the next and in succeeding compartments of said series and being highest for the thermostat switch that is identified with the last element in said last compartment of the compartment series; heat dispenser means fluidly connected between the aforementioned inlet and outlet of said boiler means and being adapted to convey heat into a defined space; a pump for circulating fluid through said heat dispenser and the said serial compartments of the boiler means; a motor for driving said pump; and control means for said motor responsive to the temperature in said defined space and organized to activate said motor and thus circulate fluid through the system when said temperature falls below a predetermined value, said circulating fluid serving to carry heat from said boiler means into said heat dispenser and thence into said defined spaced with resultant cooling of the fluid that returns to said boiler means inlet from the dispenser and accompanying activation of the said thermostat switches for as many of the said compartment heating elements as are needed to match the input of heat into said boiler means with the heat which the dispenser transfers from the circulating fluid into said defined space.

2. In a hot water heating system, the combination of a boiler having a plurality of compartments serially arranged for the passage of water successively therethrough from one compartment to the next between an entering inlet into the first compartment and a leaving inlet from the last compartment; electrical heating elements respectively disposed in said serially arranged compartments, each of said elements serving when energized to raise the temperature of the water surrounding and flowing over the element in its compartment; individual thermostat control switches for the said heating elements in the aforesaid plurality of water compartments, the said switch for each element being at the same physical location as the water around that element in its said compartment and being directly responsive to the temperature of said element-surrounding water and establishing connection of said element with a power source when and only when said compartment water temperature falls below a preselected value, said value being lowest for the thermostat switch that is identified with the heating element in said first compartment of the series and being progressively higher for the switches that are identified with the elements in the next and in succeeding compartments of the series; a heat dispenser fluidly connected between the aforementioned inlet and outlet of said boiler and being adapted to convey heat into a defined space; a pump for circulating water through said heat dispenser and the said serial compartments of the boiler; a motor for driving said pump, and control means for said motor responsive to the temperature in said defined space and organized to activate said motor and thus circulate water through the system when said temperature falls below a predetermined value, said circulating water serving to carry heat from said boiler into said heat dispenser and thence into said defined space with resultant cooling of the water that returns to said boiler inlet from the dispenser and accompanying activation of the said thermostat switches for as many of the said compartment heating elements as are needed to match the input of heat into said boiler with the heat which said dispenser transfers from the circulating water into said defined space.

3. In a hot water heating system, the combination of a boiler having a plurality of compartments serially arranged for the passage of water therethrough from one compartment to the next between an entering inlet into the first compartment and a leaving outlet from the last compartment; electrical heating elements respectively disposed in said serially arranged compartments, each of said elements serving when energized to raise the temperature of the water surrounding and flowing over the element in its compartment; individual thermostat control switches for the said heating elements in the aforesaid plurality of water compartments, the said switch for each element being at the same physical location as the water around that element in its said compartment and being directly responsive to the temperature of said element-surrounding water and establishing connection of said element with a power source when and only when said compartment water temperature falls below a preselected value, said value being lowest for the thermostat switch that is identified with the heating element in said first compartment of the series and being progressively higher for the switches that are identified with the elements in the next and in succeeding compartments of the series; a heat dispenser fluidly connected between the aforementioned inlet and outlet of said boiler and being adapted to convey heat into a defined space; said dispenser being in the form of a convector provided with a fan which blows air thereover and therethrough when a drive motor for the fan is activated; a pump for circulating water through said heat dispenser convector and through the said serial compartments of the boiler in heat absorbing relation with the said heating elements therein; a motor for driving said pump; and control means for said pump and fan motors responsive to the temperature in said defined space and organized to activate those motors and thus circulate water through the system when said temperature falls below a predetermined value, said circulating water serving to carry heat from said boiler into said heat dispensing convector and thence into said defined space via said fan blown air with resultant cooling of the water that returns to said boiler inlet from the convector and accompanying activation of the said thermostat switches for as many of the said compartment heating elements as are needed to match the input of heat into said boiler with the heat which said convector transfers from the circulating water into said defined space.

References Cited in the file of this patent
UNITED STATES PATENTS

| | | |
|---|---|---|
| 2,290,402 | Witte | July 21, 1942 |
| 2,434,575 | Marshall | Jan. 13, 1948 |
| 2,511,635 | Holmes | June 13, 1950 |
| 2,518,982 | Edwards | Aug. 15, 1950 |